(12) United States Patent
Borschert et al.

(10) Patent No.: US 7,101,125 B2
(45) Date of Patent: Sep. 5, 2006

(54) TWIST DRILL

(75) Inventors: Bernhard W. Borschert, Bamberg (DE); Jerome C. Hanna, Greensburg, PA (US); Tilo Krieg, Fürth (DE); Larry R. Meenan, Greensburg, PA (US); Michael D. Shultz, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 9 days.

(21) Appl. No.: 10/738,469

(22) Filed: Dec. 17, 2003

(65) Prior Publication Data

US 2005/0135887 A1 Jun. 23, 2005

(51) Int. Cl.
B23B 51/02 (2006.01)

(52) U.S. Cl. .................................................. 408/230

(58) Field of Classification Search ............... 408/227, 408/229, 230, 144, 713
See application file for complete search history.

(56) References Cited

U.S. PATENT DOCUMENTS

| | | | |
|---|---|---|---|
| 1,508,594 A * | 9/1924 | Brubaker, Jr. ............... 408/219 |
| 1,508,595 A * | 9/1924 | Brubaker, Jr. ................. 76/115 |
| 1,630,602 A * | 5/1927 | Blanco ....................... 408/224 |
| 3,913,196 A * | 10/1975 | Maday ........................ 407/54 |
| 4,507,028 A * | 3/1985 | Matsushita ................. 408/230 |
| 4,556,347 A | 12/1985 | Barish |
| 4,572,714 A * | 2/1986 | Suzuki et al. ............... 408/230 |
| 4,756,650 A | 7/1988 | Wakihara et al. |
| 5,312,209 A | 5/1994 | Lindblom |
| 5,350,261 A | 9/1994 | Takaya et al. |
| 5,478,176 A | 12/1995 | Stedt et al. |
| 5,584,617 A * | 12/1996 | Houser ....................... 408/1 R |
| 5,678,960 A | 10/1997 | Just et al. |
| 5,704,740 A * | 1/1998 | Ebenhoch et al. ............ 408/59 |
| 5,800,101 A * | 9/1998 | Jindai et al. ................ 408/230 |
| 6,045,305 A | 4/2000 | Plummer |
| 6,050,754 A | 4/2000 | Thomas |
| 6,132,149 A * | 10/2000 | Howarth et al. ............. 408/230 |
| 6,168,355 B1 * | 1/2001 | Wardell ........................ 407/54 |
| 6,190,097 B1 | 2/2001 | Thomas |
| 6,261,034 B1 * | 7/2001 | Cselle ......................... 408/230 |
| 6,283,682 B1 | 9/2001 | Plummer |
| 6,443,674 B1 * | 9/2002 | Jaconi ......................... 408/1 R |
| 6,582,164 B1 * | 6/2003 | McCormick ................ 408/230 |

(Continued)

FOREIGN PATENT DOCUMENTS

DE 1106144 5/1961

(Continued)

OTHER PUBLICATIONS

German Publication, Zerspanungswerkzeuge für den Sondermaschinenbau und automatische Fertigungstaktstrassen, Von Vladimir Rocek, Technischer Verlag Günter Grossmann GmbH, Stuttgart-Vaihingen, 1972, pp. 78-79, Germany.

(Continued)

Primary Examiner—Monica Carter
Assistant Examiner—Michael W. Talbot
(74) Attorney, Agent, or Firm—Larry R. Meenan

(57) ABSTRACT

A twist drill including a cutting tip having a front flank face, a substantially cylindrical tool body extending rearwardly from the cutting tip, and a shank. The tool body includes a rotational axis therethrough and at least one flute formed on an outer peripheral surface thereof and extending to the front flank face. The at least one flute includes a first helical portion opening to the front flank face and a second helical portion extending from the rear end of the first helical portion toward the rear portion of the tool body. The second helical portion twists in a direction opposite of the first helical portion.

20 Claims, 3 Drawing Sheets

U.S. PATENT DOCUMENTS

| | | | |
|---|---|---|---|
| 6,585,460 B1* | 7/2003 | Meece et al. | 408/230 |
| 6,652,203 B1* | 11/2003 | Risen, Jr. | 408/225 |
| 6,821,061 B1* | 11/2004 | Frejd | 408/59 |
| 2002/0057951 A1* | 5/2002 | Silver | 408/230 |
| 2002/0102141 A1* | 8/2002 | Meece et al. | 408/230 |
| 2002/0141842 A1* | 10/2002 | Tsuzaka et al. | 408/230 |
| 2002/0159851 A1* | 10/2002 | Krenzer | 408/230 |
| 2003/0175086 A1* | 9/2003 | Muhlfriedel et al. | 408/230 |
| 2003/0185640 A1* | 10/2003 | Ito | 408/230 |
| 2003/0219321 A1* | 11/2003 | Borschert et al. | 408/230 |
| 2004/0067115 A1* | 4/2004 | Yamamoto | 408/230 |
| 2004/0101379 A1* | 5/2004 | Mabuchi et al. | 408/230 |

FOREIGN PATENT DOCUMENTS

| | | | |
|---|---|---|---|
| DE | 29722002 | | 3/1998 |
| FR | 2829715 | | 3/2003 |
| GB | 2310622 A | | 9/1997 |
| JP | 60094211 A | * | 5/1985 |
| JP | 61226209 | | 10/1986 |
| JP | 3117532 | | 5/1991 |
| JP | 2000198010 A | * | 7/2000 |
| SU | 1774904 A | | 11/1992 |

OTHER PUBLICATIONS

Catalogue 2071, "Holemaking New Products," Kennametal Inc., Latrobe, PA, 2002.

Ogawa, Makoto et al., "Micro drilling of 5056 wrought aluminum alloy," Keikinzoku/Journal of Japan Institute of Light Metals, 44 Sep. 9, 1994, pp. 486-491, Japan.

Brochure "Ken-Tip Drill," Kennametal Inc., Latrobe, PA, pp. H112-H115.

Transmittal of the International Search Report and The Written Opinion of the International Searching Authority, or the Declaration, mailed Jun. 1, 2005, in corresponding application PCT/US2004/40829, filed Dec. 6, 2004.

Transmittal of International Preliminary Report on Patentability, mailed May 8, 2006, in corresponding application PCT/US2004/40829, filed Dec. 6, 2004.

* cited by examiner

TWIST DRILL

BACKGROUND OF THE INVENTION

1. Field of the Invention

This invention relates to a twist drill. More particularly, this invention relates to a twist drill having a tool body including helical flutes in the outer peripheral surface of the tool body to smoothly discharge cuttings chips and provide improved rigidity against cutting resistance.

2. Description of the Related Art

A conventional twist drill comprises a cylindrical tool body provided with at least one helical flute and land, wherein the flute and the land follow a helical angle to a forward cutting point. The rearward end of the tool body of the twist drill is securable in a chuck; for example, of a hand tool, or a drilling machine. The cutting point of the drill is of generally conical-shape, with a cutting edge from which a pair of diametrically opposed cutting edges defined by the leading faces of the fluted lands and the flanks of the drill point that form the end faces of the fluted lands. The outer periphery of each fluted land has at its leading edge a radial projection which is variously termed a land, a cylindrical land, and a support margin. These two support margins extend along the length of the fluted lands.

The design of the flute of the twist drill is extremely critical to its performance. The design of the flute determines the ability of the twist drill to form, accommodate, and evacuate chips produced during the cutting operation, thus carrying away heat.

SUMMARY OF THE INVENTION

Briefly, according to this invention, there is provided a twist drill. The twist drill includes a cutting tip having a front flank face, a substantially cylindrical tool body extending rearwardly from the cutting tip, and a shank. The tool body includes a rotational axis therethrough and at least one flute formed on an outer peripheral surface thereof and extending to the front flank face. The at least one flute includes a first helical portion opening to the front flank face and a second helical portion extending from the rear end of the first helical portion toward the rear portion of the tool body. The second helical portion twists in a direction opposite of the first helical portion. In an alternate embodiment, the twist drill further comprises a third helical portion. The third helical portion twists in a direction opposite of the second helical portion.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
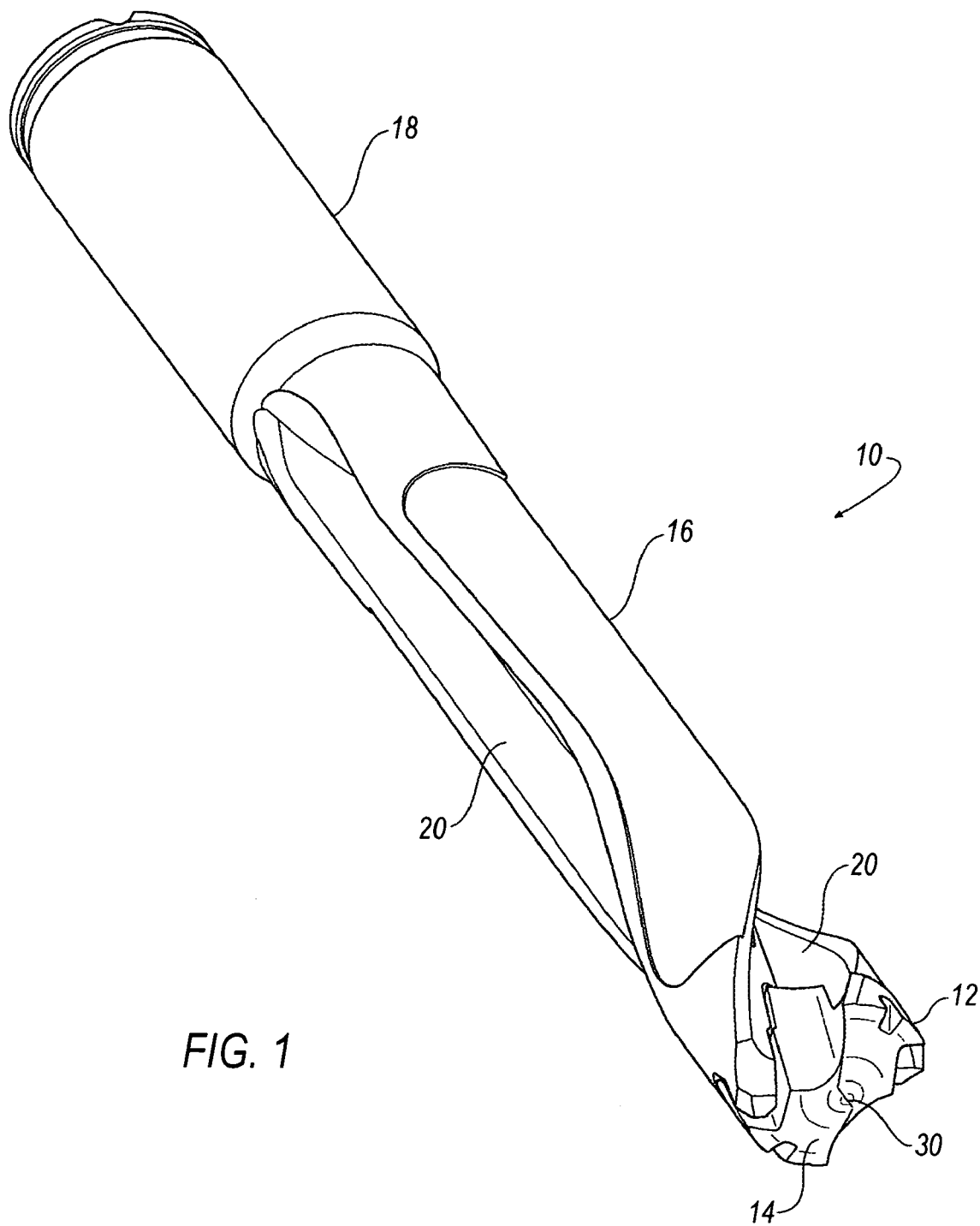
FIG. 1 is a perspective view of a drill in accordance with the present invention.

Referring to the drawings, wherein like reference characters represent like elements, there is shown a twist drill 10 in accordance with the present invention. The twist drill includes three principal sections. The first section of the twist drill is the point or cutting tip 12 including a front flank face 14. The cutting tip 12 does the cutting of a work piece to form a hole. Adjacent the first section of the twist drill 10 is the second section comprising the tool body 16. The tool body 16 extends rearwardly from the cutting tip 12. The third section of the twist drill 10 is the shank 18 or solid part of the twist drill that does not have flutes.

It will be appreciated that the point or cutting tip 12 of the twist drill 10 may take most any suitable form. For example, although the present invention is shown in the form of a twist drill 10 having a cutting point geometry formed by a removable insert cutting tip, the twist drill may also be formed as a solid twist drill formed of metal or cemented carbide and the like as well known in the art. Consequently, the illustration of the flute design on a twist drill 10 having a removable cutting point is not to be construed as a limitation of the invention except as otherwise claimed.

For purposes of illustrating the present invention, the cutting tip 12 is shown as an interchangeable cutting tip. For a more detailed description of an interchangeable cutting tip, reference is made to Patent Application No. PCT/EP03/01526 entitled Rotary Cutting Tool Comprising an Exchangeable Cutting Insert, incorporated herein by reference in its entirety. It will be appreciated that various cutting tip configurations may be designed and selected to achieve acceptable cutting rates, depending upon the work piece material and drilling conditions as well known in the art. For example, other cutting tip 12 configurations that may also be used in exemplary embodiments of the invention include a split point, rolled notched point, single-angle point, double-angle point, reduced rake point, helical point, multi-facet point, rounded edge point and the like. In a preferred embodiment, the cutting tip 12 configuration is an S-shaped chisel edge.

The point or cutting tip 12 of the twist drill 10 is operatively attached to the tool body 16. The tool body 16 may be made of steel; for example, high speed steel or cemented carbide as previously described. The tool body 16 includes at least one helical flute 20 and land 22. In a preferred embodiment, a pair of helical flutes 20 are formed in the peripheral outer surface of the tool body 16.

It will be appreciated that the design of the flute 20 of the twist drill 10 is extremely critical to its performance. The design of the flute 20 determines the ability of the twist drill 10 to form, accommodate, and evacuate chips produced during the cutting operation, thus carrying away heat.

In accordance with the present invention, the flute 20 of the twist drill 10 comprises a first helical portion 24 and a second helical portion 26. The first helical portion 24 opens to the front flank face 14 of the cutting tip 12 and twists at a helix angle toward the second helical portion 26. The helix angle $\theta_A$ of the first helical portion 24 may be varied or substantially constant over the length from the cutting tip 12 to the tool body 16 and on a portion of the flutes in the tool body in section A.

In the event that the twist drill 10 includes one or more coolant holes 11, it will be appreciated that the rotational position of the cutting tip and the length of the first helical portion 24 may be adjusted based upon the position of the coolant hole exit, which is preferably aligned with the cutting edges in order to ensure an optimum delivery of coolant and lubricant during the cutting operation.

In a preferred embodiment, in order to ensure easy chip formation and chip transport from the cutting zone, the first helical portion 24 is positioned at a positive helix angle $\theta_A$ (i.e., rake angle) with respect to the tool body central axis 28. The helix angle $\theta_A$ of the first helical portion 24 is about 0 to about 40 degrees, and preferably about 30 degrees. It will be appreciated that the first helical portion 24 may also be positioned at a negative helix angle. As used herein, the terms positive helix angle and negative helix angle refer to the rotational direction of the helix with respect to the tool body central axis 28. A positive helix angle decreases the cutting wedge, whereas a negative helix angle increases it.

The second helical portion 26 twists in a direction opposite from the first helical portion 24. The second helical portion 26 extends from the rear of the first helical portion 24 as indicated by the symbol "B" toward the point indicated by the symbol "C" in FIG. 2.

The second helical portion helix angle $\theta_B$ twists in the opposite direction from the first helical portion $\theta_A$ for the purpose of orienting the stiffest cross sectional area of the twist drill 10 towards an angle at which the cutting point chisel edge 30 provides the weakest self-centering properties. This angle approximates the cutting point chisel edge angle 30. The cutting point chisel edge angle is selected to optimize the cutting conditions of the cutting point. Unfortunately, the cutting point chisel edge angle is also known as the weakest direction, because the cutting point chisel edge acts as a blade on which the point can "slide" and cause deflection of the twist drill tool body during cutting when the initial contact of the twist drill to the workpiece occurs. In the preferred embodiment, the angle at which the S-shaped cutting point chisel edge 30 provides the weakest self-centering properties is parallel to the longitudinal length of the chisel edge.

It is believed that the second helical portion 26 twisting in the opposite direction increases the stiffness of the tool body 16 of the twist drill along the chisel edge 30 thereby reducing drill deflection and allowing for the formation of straighter and more accurate holes.

The helix angle $\theta_B$ of the second helical portion 26 may be varied or maintained substantially constant over the length from point B to point C. The maximum length of the second helical portion is set in a range up to about 7D (wherein D is the cutting diameter of the tip). The helix angle $\theta_B$ of the second helical portion 26 may range from about 1 to about 30 degrees, preferably about 3 degrees from point B to point C. In a preferred embodiment, the second helical portion 26 is positioned at a negative helix angle.

The twist drill 10 may include a third helical portion 32. The third helical portion 32 twists in a direction opposite of the second helical portion 26. In a preferred embodiment, the third helical portion 32 is positioned at a positive helix angle.

Figure 2:
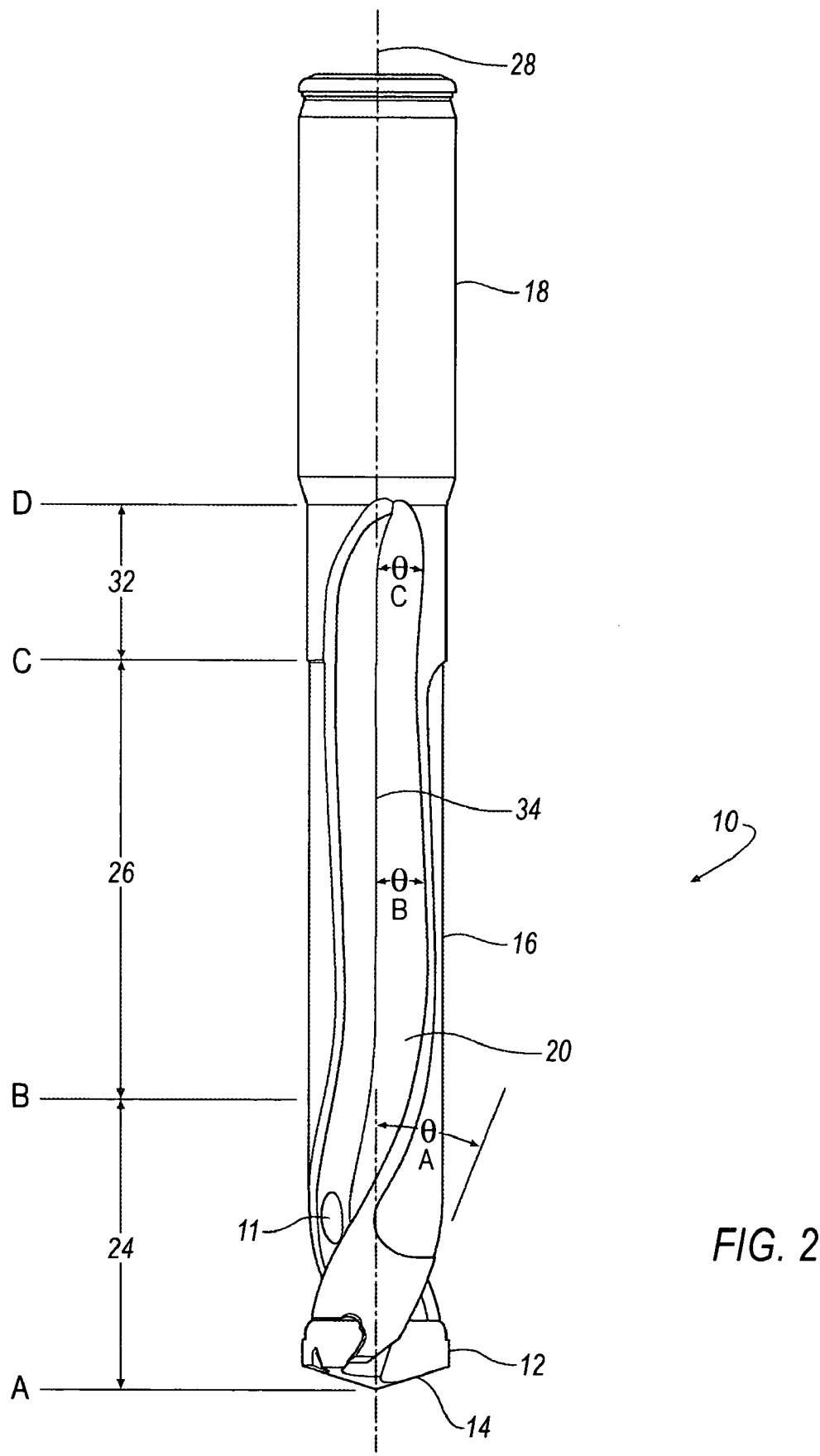
FIG. 2 is a side view of the drill of FIG. 1.
Figure 3:
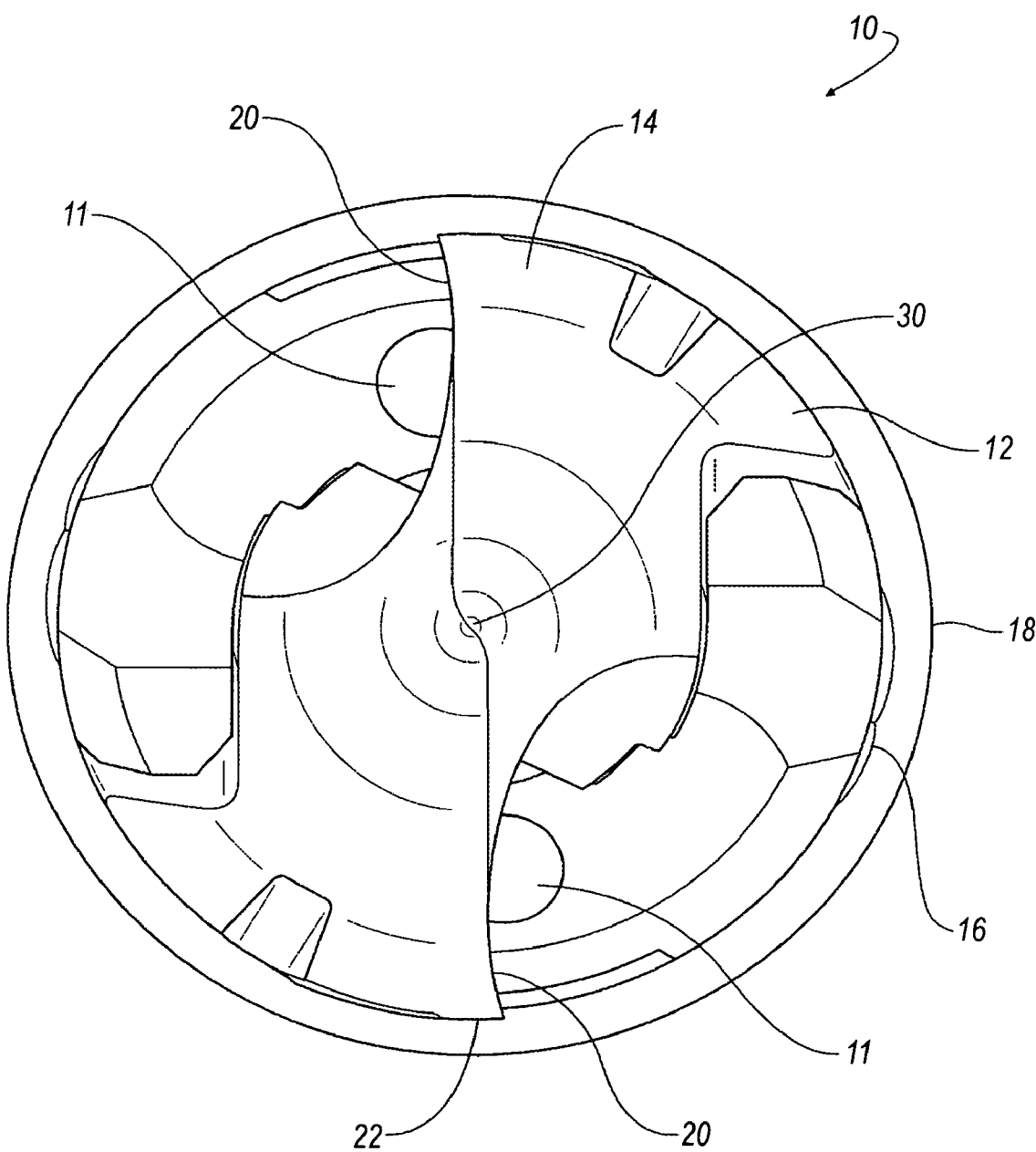
FIG. 3 is an end view of the drill of FIG. 1.

The third helical portion 32 extends from the rear of the second helical portion 26 as indicated by the symbol "C" to the shank 18 of the twist drill 10 indicated by the symbol "D" in FIG. 2. The helix angle $\Theta_C$ of the third helical portion 32 may be varied or maintained substantially constant over the length from point C to point D.

The third helical portion 32 has been found to lower torque, thrust, and horsepower than that required by a twist drill not incorporating the third helical portion. It is believed that the third helical portion 32 provides an advantage in the chip evacuation process. Without being bound by any one theory, it is believed that the third helical portion 32 functions similar to an extrusion screw and pulls the chips out of the hole being cut. It further believed that the effects of the third helical portion 32 would be particularly beneficial in deep hole drilling conditions.

The helix angle $\theta_C$ of the third helical portion 32 may range from about 0 to about 40 degrees, preferably about 5 degrees, from point C to point D along the length thereof.

The thickness of the web 34 of the twist drill 10 may be of most any suitable design. For example, the web 34 thickness may be substantially constant along the length of the twist drill 10, tapered along the length of the twist drill or a combination thereof. In a preferred embodiment, the depth of the flute 20 toward the rear end of the tool body 16 is greater than the depth of the flute toward the front end of the tool body such that contact between cuttings or chips and the inner wall of the machined hole by the twist drill and the flute can be effectively prevented, and smooth discharge of chips can be ensured. In a most preferred embodiment, the web thickness at the cutter bit along the first helical portion 24 is greater than the web thickness along the second helical portion 26 and is greater than the web thickness along the third helical portion 32.

It will be appreciated that although the twist drill 10 as described comprises a first helical portion 24, second helical portion 26 and alternatively, a third helical portion 32, it will be appreciated that additional helical portions may also be added to the twist drill beyond that described herein. For example, a fourth helical portion may be added to the twist drill.

The invention will be further clarified by a consideration of the following examples, which are intended to be purely exemplary of the invention.

EXAMPLE 1

A twist drill including a +30 degree helix first portion, −3 degree reverse helix second portion and a +5 degree helix third portion (Sample 1) was tested against a twist drill including a +30 degree helix first portion and a −3 degree reverse helix second portion (Sample 2).

The diameter of each drill was 16 mm and the cutting tip material was cemented carbide grade KC7315 commercially available from Kennametal Inc. The cutting end configuration of each drill was an identical S-shaped drill point.

Experimental conditions:
Number of holes drilled: 6
Cutting speed=80 m/min,
Feed rate=0.45 mm/rev,
Hole depth=80 mm.
Material to be cut: 4140 steel (200 Brinnel Hardness) using internal coolant @ 200 PSI.

A Kistler 9272 machining dynamometer was used to measure torque and thrust forces. The dynamometer determines the forces close to the cutting process and makes it possible to measure the spindle torque and thrust forces during drilling. The test results are as shown in Table 1 below.

TABLE 1

| | | 16 mm Twist Drill | | |
|---|---|---|---|---|
| Flute | Feed (ipr) | Average Torque (in.-lbs.) | Average Thrust (lbs.) | Average Horsepower (Hp) |
| Sample 1 | 0.45 | 302.3 | 807.2 | 7.62 |
| Sample 2 | 0.45 | 316.4 | 836.6 | 7.79 |

As shown in Table 1, higher torque, thrust, and horsepower readings were observed with twist drills without the third helical portion. The third helical portion provided about 4.5 percent improvement in reduced torque, about 3.5 percent improvement in reduced thrust and about 2.2 percent improvement in reduced average horsepower when compared to the twist drill not including the third helical portion under substantially identical drilling conditions.

EXAMPLE 2

Three twist drills were subjected to Finite Element Analysis (FEA). The diameter of the twist drills was 8 mm and the tool body length was 40 mm. The cutting end configuration of each twist drill was an S-shaped drill point.

The Sample 1 twist drill included a +30 degree helix first portion and a 0 degree helix second portion, Sample 2 twist drill included a +30 degree helix first portion and a −3 degree reverse helix second portion and a 0 degree helix third portion and Sample 3 twist drill included a +30 degree helix first portion, a −3 degree reverse helix second portion and a +5 degree helix third portion.

A 50 Newtons force was applied in a direction aligned with the longitudinal length of the chisel edge. The resultant displacement of the cutting tip of the twist drill was then determined through FEA analysis.

TABLE 2

|  | Sample 1 | Sample 2 | Sample 3 |
|---|---|---|---|
| Resultant Displacement (mm) | 0.349 | 0.317 | 0.329 |

As shown in Table 2, the second helical portion of the Sample 2 twist drill increases the strength of the stiffness of the tool body of the twist drill along the S-shaped chisel edge by about 9.2 percent as compared to a twist drill not including a reverse helix second portion (Sample 1). Furthermore, a twist drill including a reverse helix second portion and third portion (Sample 3) had an increased stiffness of about 5.7 percent as compared to a twist drill not including either a second or third reverse helix portion (Sample 1).

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A twist drill comprising:
a cutting tip including a front flank face, a substantially cylindrical tool body extending rearwardly from the cutting tip, and a shank;
the tool body having a rotational axis therethrough and including at least one flute formed on an outer peripheral surface thereof and extending to the front flank face;
wherein the at least one flute includes a first helical portion opening to the front flank face and a second helical portion extending from the rear end of the first helical portion and a third helical portion extending from the rear of the second helical portion toward the rear portion of the tool body, wherein the second helical portion twists in a direction opposite of the first helical portion and wherein the third helical portion twists in a direction opposite of the second helical portion.

2. The twist drill of claim 1 wherein the first helical portion is positioned in a positive helix.

3. The twist drill of claim 1 wherein the cutting tip is an interchangeable cutting tip.

4. The twist drill of claim 1 wherein the cutting tip includes an S-shaped chisel edge.

5. The twist drill of claim 1 wherein the tool body is made of steel.

6. The twist drill of claim 1 wherein the tool body is made of cemented carbide.

7. The twist drill of claim 1 wherein the tool body includes a pair of helical flutes formed in a peripheral outer surface of the tool body.

8. The twist drill of claim 7 wherein the helix angle of the first helical portion is maintained constant from the cutting tip to the tool body and on a portion of the flutes in the tool body.

9. The twist drill of claim 1 wherein the twist drill includes at least one coolant hole.

10. The twist drill of claim 1 wherein the helix angle of the first helical portion is about 0 to about 40 degrees.

11. The twist drill of claim 10 wherein the helix angle of the first helical portion is about 30 degrees.

12. The twist drill of claim 1 wherein the helix angle of the second helical portion is from about 1 to about 30 degrees.

13. The twist drill of claim 12 wherein the helix angle of the second helical portion is about 3 degrees.

14. The twist drill of claim 1 wherein the third helical portion extends from the rear of the second helical portion to the shank of the drill.

15. The twist drill of claim 1 wherein the helix angle of the third helical portion is constant.

16. The twist drill of claim 1 wherein the helix angle of the third helical portion is from about 0 to about 40 degrees.

17. The twist drill of claim 1 wherein the helix angle of the third helical portion is about 5 degrees.

18. The twist drill of claim 1 wherein the twist drill has web thickness that is constant along the length of the twist drill.

19. The twist drill of claim 1 wherein the twist drill has a web thickness that is tapered along the length of the twist drill.

20. The twist drill of claim 1 wherein the twist drill has a web thickness that varies along the longitudinal length of the twist drill.

* * * * *